(12) United States Patent
Ohki

(10) Patent No.: US 7,052,266 B2
(45) Date of Patent: May 30, 2006

(54) APPARATUS FOR MAKING FIBER-CONTAINING RUBBER STRIPS

(75) Inventor: Masahiko Ohki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 214 days.

(21) Appl. No.: 10/372,213

(22) Filed: Feb. 25, 2003

(65) Prior Publication Data

US 2003/0170335 A1    Sep. 11, 2003

(30) Foreign Application Priority Data

Feb. 25, 2002    (JP) ............................... 2002-48312

(51) Int. Cl.
*B29C 47/02*    (2006.01)

(52) U.S. Cl. .................. 425/309; 425/314; 425/381.2; 425/377; 425/464

(58) Field of Classification Search ............ 425/381.2, 425/464, 377, 309, 314
See application file for complete search history.

(56) References Cited

U.S. PATENT DOCUMENTS 3,511,190 A * 5/1970 Kunz .......................... 425/331
5,486,102 A * 1/1996 Ettie et al. .................. 425/202

FOREIGN PATENT DOCUMENTS

| DE | 43 08 023 A | 5/1994 |
| DE | 100 02 612 A | 9/2000 |
| EP | 0 657 272 A | 6/1995 |
| GB | 1 493 836 A | 11/1977 |

* cited by examiner

*Primary Examiner*—Joseph S. Del Sole
(74) *Attorney, Agent, or Firm*—Birch, Stewart, Kolasch & Birch, LLP

(57) ABSTRACT

An apparatus for making strips of fiber-containing rubber is disclosed, wherein the short fibers in each of the strips are oriented in the widthwise direction of the strip. The apparatus comprises: a screw section for pushing out a fluid mixture of unvulcanized rubber and short fibers as fiber-containing rubber; an orienting section comprising a radially extending path provided with an inlet in the center thereof and a looped nozzle on the periphery thereof so that the fiber-containing rubber is expanded circumferentially while flowing radially from the center towards the periphery; and a dividing section comprising a plurality of cutters arranged around the looped nozzle so that the fiber-containing rubber extruded from the looped nozzle is circumferentially divide into a plurality of strips.

13 Claims, 6 Drawing Sheets

APPARATUS FOR MAKING FIBER-CONTAINING RUBBER STRIPS

BACKGROUND OF THE INVENTION

1. Field of the Invention

The present invention relates to an apparatus for making a strip of fiber-containing rubber, more particularly to an extruder being capable of extruding a plurality of strips of fiber-containing rubber whose short fibers are oriented in the widthwise direction of the strip.

2. Related Art

In making rubber products such as pneumatic tire for example, for the purpose of reinforcing its rubber component, or providing a rubber component with anisotropy or the like, fiber-containing rubber compounds are sometimes used to make such rubber component or layer of the product. In making a pneumatic tire, sometimes, an unvulcanized rubber strip containing short fibers oriented in a specific direction is used to make a specific tire component. For example, using a strip including short fibers oriented in the widthwise direction thereof, a tread rubber can be made by winding the strip around a drum. If a relatively wide strip is wound while keeping the widthwise direction thereof almost parallel to the axis of the drum, the fibers in the tread rubber are oriented in the widthwise direction of the tread which may improve steeling stability without deteriorating ride comfort. If a relatively narrow strip is wound while keeping the widthwise direction thereof almost perpendicular to the axis of the drum, the fibers in the tread rubber are oriented in the radial direction of the tire which may improve road grip, traction, wet grip (on-the-ice performance) and the like.

It is therefore, an object of the present invention to provide an apparatus by which a plurality of rubber strips containing short fibers oriented in the widthwise direction thereof can be continually made at the same time, allowing for more efficient production and downsizing and simplifying of the apparatus.

BRIEF SUMMARY OF THE INVENTION

According to the present invention, an apparatus for making strips of fiber-containing rubber comprises a screw section for pushing out a fluid mixture of unvulcanized rubber and short fibers as fiber-containing rubber, an orienting section comprising a radially extending path for the fiber-containing rubber provided with an inlet in the center thereof and a looped nozzle on the periphery thereof so that the fiber-containing rubber is expanded circumferentially while flowing radially from the center towards the periphery, a dividing section comprising a plurality of cutters arranged around the looped nozzle so that the fiber-containing rubber extruded from the looped nozzle is circumferentially divide into a plurality of strips, whereby the short fibers in each of the strips are oriented in the widthwise direction of the strip.

An embodiment of the present invention will now be described in detail in conjunction with the accompanying drawings.

DETAILED DESCRIPTION OF THE INVENTION

Figure 1:
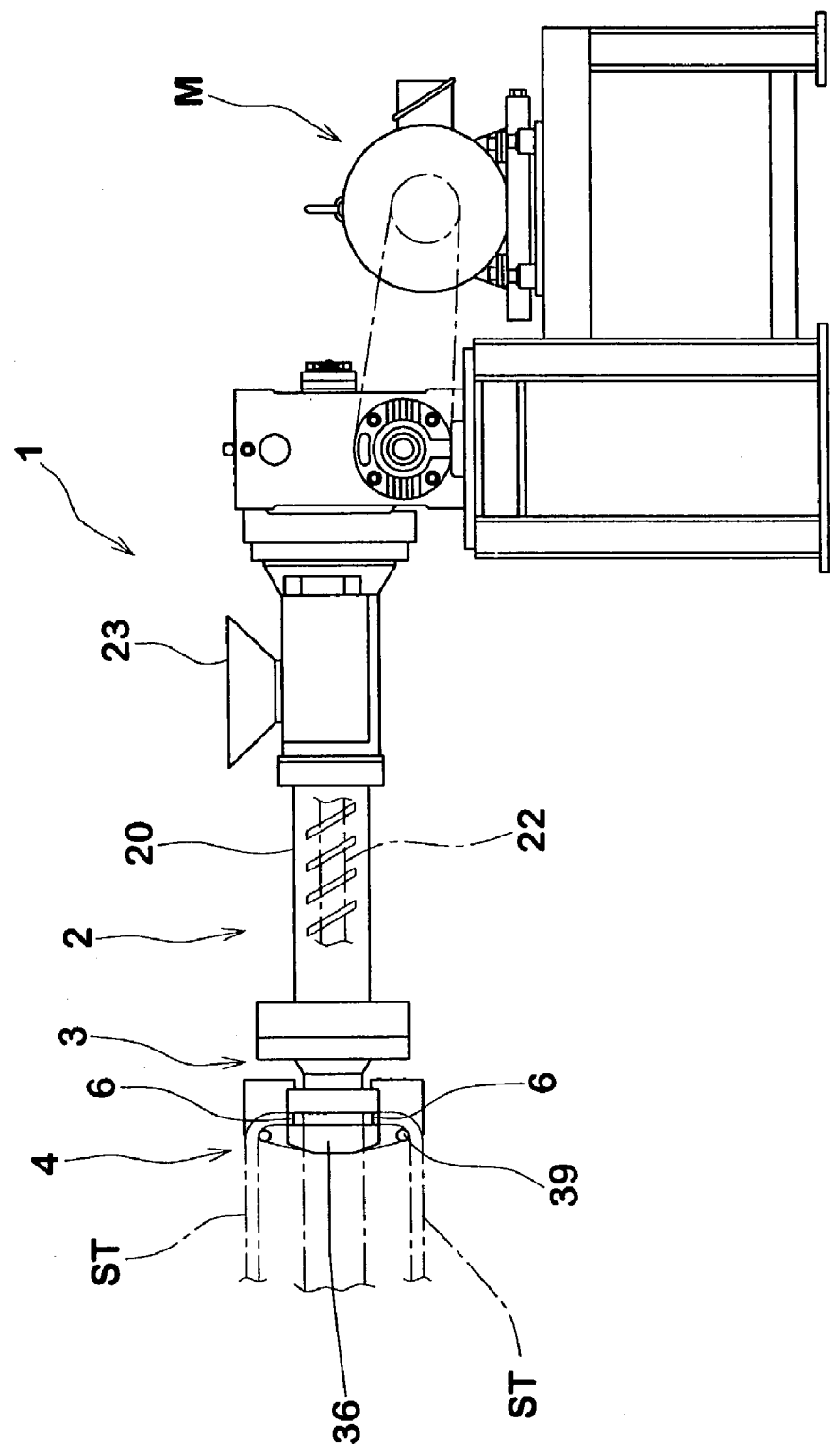
FIG. 1 is a side elevational view of an apparatus for making strips of fiber-containing rubber according to the present invention.
Figure 2:
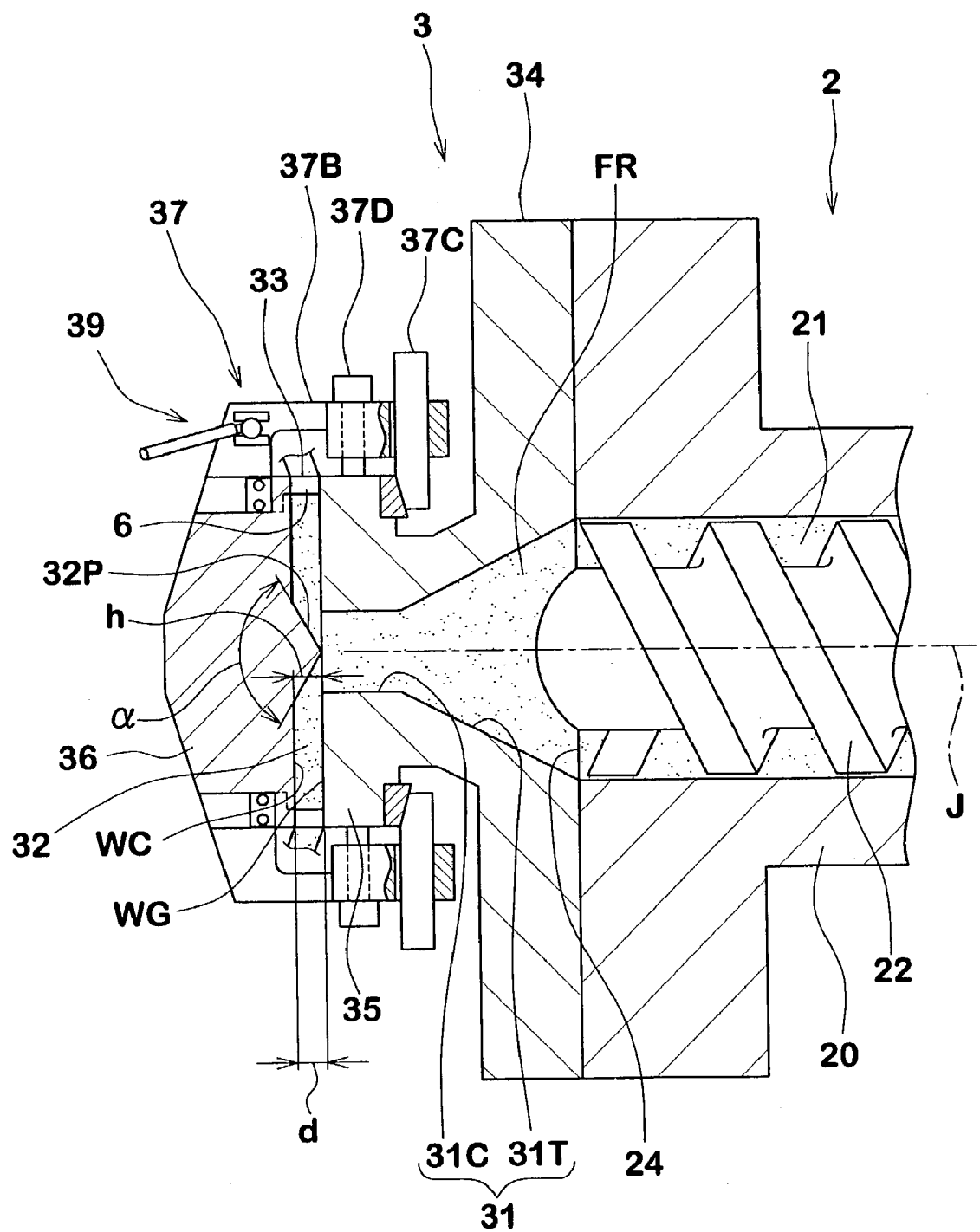
FIG. 2 is a cross sectional view of the head thereof.
Figure 3:
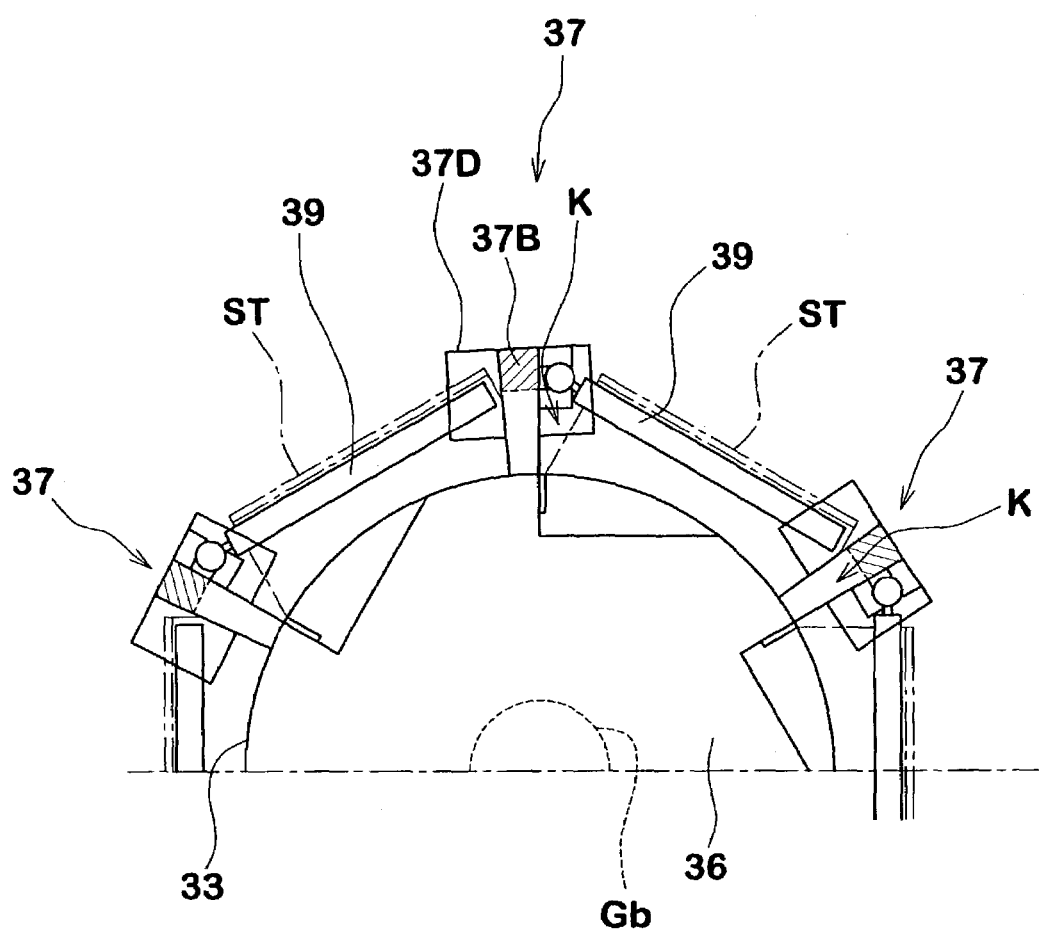
FIG. 3 is a front view of the head showing an upper half thereof.

In the drawings, apparatus 1 for making a plurality of strips ST of fiber-containing rubber FR according to the present invention comprises a screw section 2, an orienting section 3, and a dividing section 4. In this embodiment, the apparatus 1 is incorporated in a tire manufacturing system.

The screw section 2 comprise a main body 20 having a cylindrical mixing chamber 21, a screw 22 disposed therein, and an electric motor M for rotating the screw 22. Using an inlet 23 provided on the backside of the main body 20, raw rubber materials and short fibers are put into the cylindrical mixing chamber 21. By rotating the screw 22, the raw rubber materials and short fibers in the cylindrical mixing chamber 21 are mixed into fiber-containing raw rubber FR, and the mixture is pushed towards an outlet 24 at the front end of the main body 20.

The orienting section 3 comprises a first orienting path 31 extending in a direction (horizontal direction) and a second orienting path 32 extending radially from the front end of the first orienting path 31 to a looped nozzle 33.

The first orienting path 31 comprises a tapered path 31T and a substantially constant diameter path 31C. The tapered path 31T has a rear end which is connected to the outlet 24 of the screw section 2 and into which the fiber-containing rubber FR is pushed. The tapered path 31T has a shape of frustum of circular cone tapering from the rear end to the front end thereof. The substantially constant diameter path 31C extends from the front end of the tapered path 31T to its front end while maintaining a substantially constant inside diameter D1 so as to have a shape of circular cylinder. Therefore, the fiber-containing rubber FR is decreased in the outside diameter while passing though the tapered path 31T, but during passing though the path 31C, the outside diameter maintains a constant value. As a result, the short fibers are gradually oriented in the flowing direction, and at the front end of the substantially constant diameter path 31C, the orientation in the flowing direction is maximized. In this embodiment, the first orienting path 31 is formed by a through hole of an orifice ring 34 attached to the front of the main body 20.

The second orienting path 32 is defined between a collision wall WC and an opposite guide wall WG which have circular forms of the substantially same diameter. At the center of the guide wall WG, the front end of the first orienting path 31 opens to the inside of the second orienting path 32, and the center of the collision wall WC confronts with the opening of the first orienting path 31. The guide wall WG is flat and extends radially from the edge of the opening of the first orienting path 31 at right angles with respect to the axial direction J of the first orienting path 31 or the flowing direction. The collision wall WC is, aside from a central portion, flat and parallel with the guide wall WG. Therefore, the second orienting path 32 extends radially from its center to the periphery which opens as the looped nozzle 33.

Figure 6:
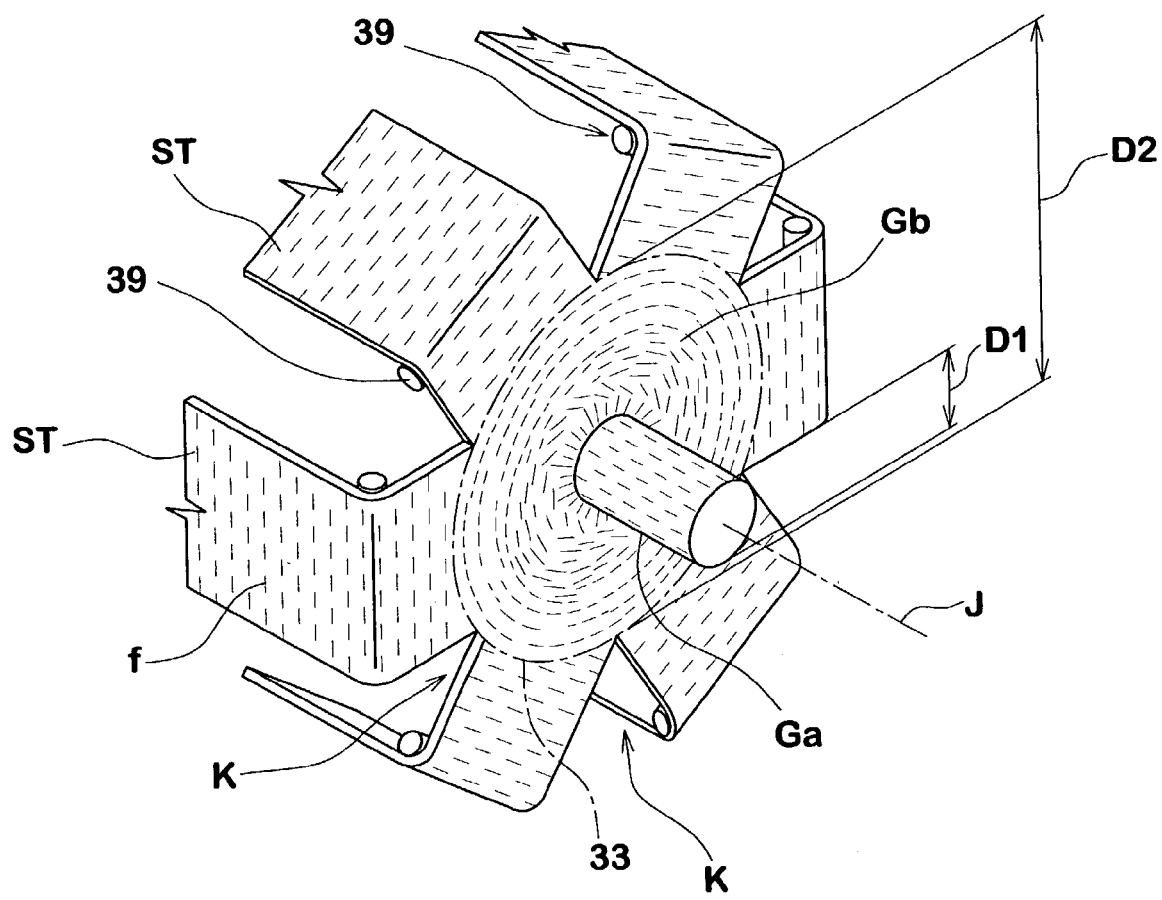
FIG. 6 is a perspective diagram schematically showing the flow direction of the fiber-containing rubber and the orient direction of the short fibers therein.

The fiber-containing rubber FR going into the second orienting path 32 comes into collision with the collision wall WC and turns its flowing direction by 90 degrees and the fiber-containing rubber FR flows radially. Thus, the fiber-containing rubber FR turns from the columnar state Ga in the constant diameter path 31C to a radially spreading disk-like state Gb as shown in FIG. 6. As the fiber-containing rubber FR spreads radially, the rubber expands circumferentially and the fibers therein are oriented in the circumferential direction. The orientation in the circumferential direction is maximized at the looped nozzle 33.

In order to effectively orient the short fibers in the circumferential direction at the looped nozzle 33, the gap (d) between the guide wall WG and the collision wall WC is set in a range of from 0.5 to 10.0 mm, and the diameter D1 of the substantially constant diameter path 31C is set in a range of not more than 1/3 times the diameter D2 of the second orienting path 32 at the looped nozzle 33.

The central portion of the collision wall WC may be a flat face, but it is preferably formed as a protruding circular conical surface 32P whose cone axis is aligned with the axis J of the first orienting path 31 in order to further the orientation and make the flow volume even in every radial direction. The circular conical surface 32P protrudes towards the front end of the substantially constant diameter path 31C, and the amount of protrusion (h) is preferably set in a range of from 0.5 to 1.2 times the gap (d) of the second orienting path 32, and the corn angle alpha is preferably set in a range of 90 to 150 degrees, and the diameter of the base of the corn is substantially equal to the diameter of the inlet of the second orienting path 32, namely, the above-mentioned diameter D1.

Figure 4:
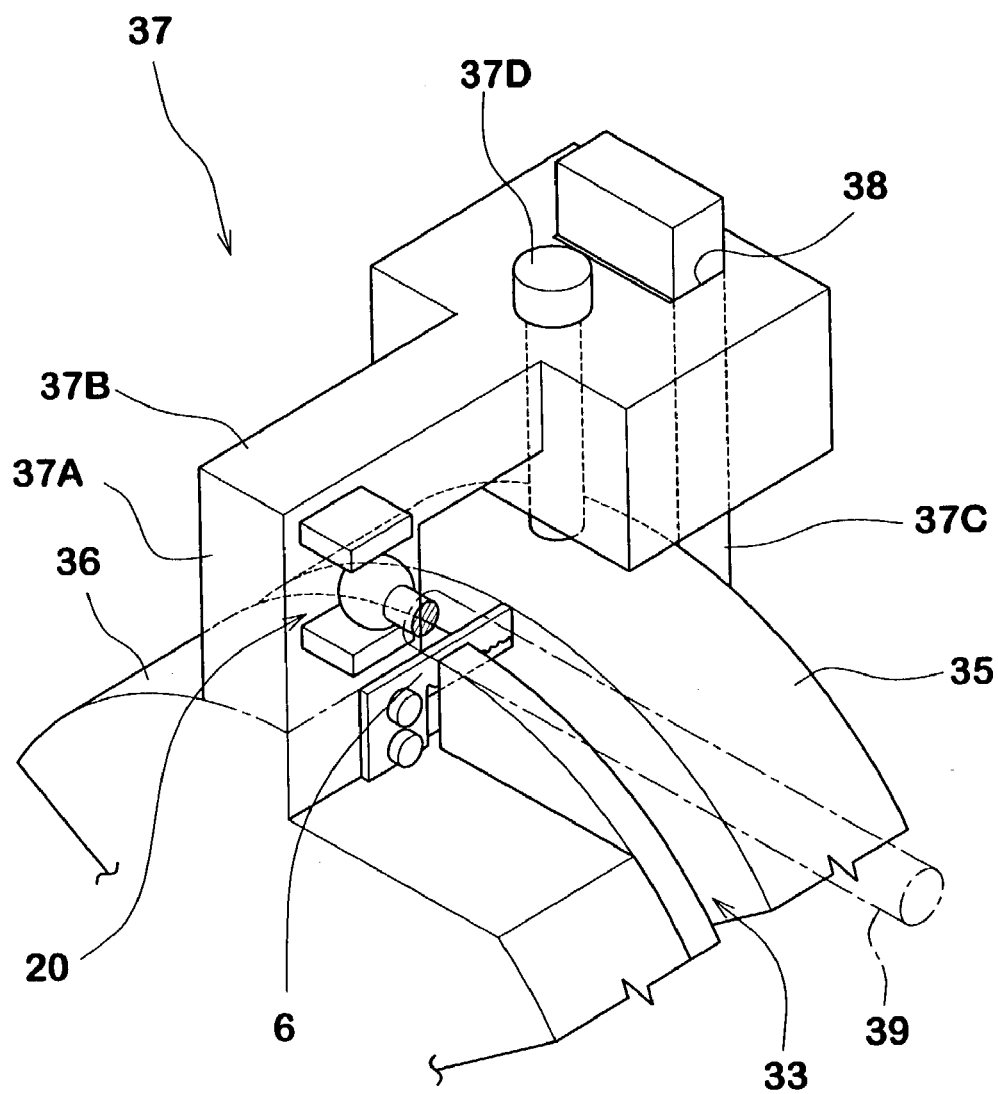
FIG. 4 is an enlarged perspective partial view of the head.
Figure 5:
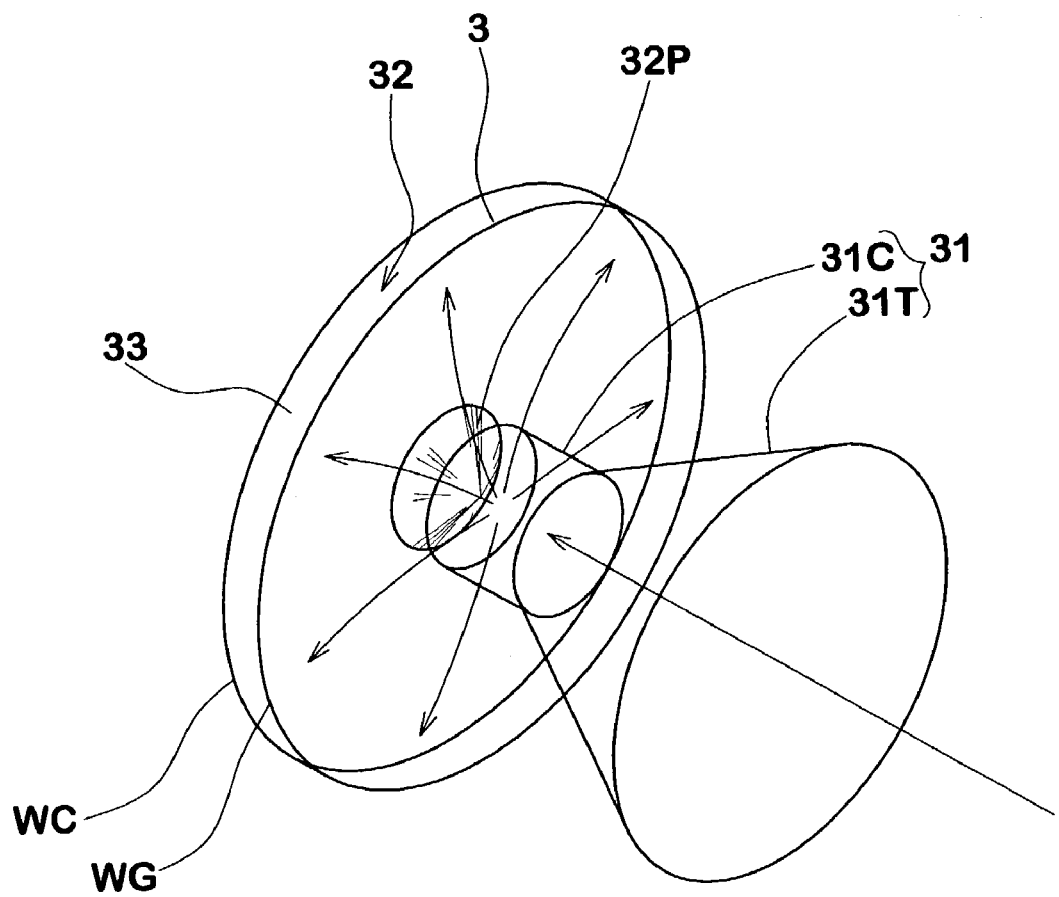
FIG. 5 is a perspective view of a fiber orienting path shown like a wireframe model.

The above-mentioned dividing section 4 comprises cutters 6 disposed near the looped nozzle 33 and extending across the looped nozzle 33. In this embodiment, six cutters 6 are equiangularly arranged around the looped nozzle 33. The cutter 6 may be a wire or cord, but in this example, a platy blade is used. As shown in FIG. 4, the cutters 6 protrude into a periphery portion of the second orienting path 32 through radially extending slots which are formed on the collision wall WC.

In this embodiment, the above-mentioned guide wall WG is defined by the front surface of a flange 35 of the orifice ring 34. The collision wall WC is defined by the rear surface of a cap plate 36. The cap plate 36 is disposed on the front of the orifice ring 34 and supported by support arms 37 while leaving the above-mentioned gap (d).

The support arm 37 comprises: a radially extending part 37A extending radially outwardly from the periphery of the cap plate 36; an axially extending part 37B extending across the looped nozzle 33 from the radially extending part 37A and provided with a slot 38 in the rear end portion thereof or the other end portion than the part 37A; a wedge-shaped lock pin 37C inserted into the slot 38 so as to protrude radially inwardly to the backside of the flange 35 so as to lock the flange 35; and an adjusting bolt 37D provided on the axially extending part 37B. Therefore, a plurality of the adjusting bolts 37D are arraigned around the circular flange 35. By fastening the adjusting bolts 37D, the cap plate 36 is secured to the circular flange 35. By adjusting the bolts 37D, the centers of the guide wall WG and collision wall WC can be aligned. By controlling the radially inward protrusion of the wedge-shaped lock pins 37C, the gap and parallelness between the two walls WG and WC can be adjusted. In the above-explained example, the support arms 37 are constructed to extend from the cap plate 36 to the orifice ring 34. But, it is also possible to construct them to extend reversely from the orifice ring 34 to the cap plate 36 to secure the cap plate 36 between the adjusting bolts 37D.

In this embodiment, the above-mentioned cutters 6 are disposed at the positions of the support arms 37, and each of the cutter 6 is fixed to a side face of the radially extending part 37A of one of the support arms 37 as shown in FIG. 4. After the cutters 6 divide the fiber-containing rubber FR into a plurality of strips ST, the strips ST are guided and moved radially for a short distance from the looped nozzle 33. Thus, radially increasing gaps K are formed between the adjacent strips ST, and the above-mentioned axially extending part 37B are positioned in the gaps K. The divided strips ST are each turned in the moving direction (now radially outwards) towards the front direction by guide rollers 39 provided one for each strip ST. In this example, as shown in FIG. 4, each of the guide rollers 39 is mounted on the support arm 37 using an universal joint 20, e.g. ball joint between one end of the guide roller 39 and one of the side faces of the support arm 37.

By the way, on the downstream of the apparatus 1, conveyers, take-up reels of a take-up machine, accumulators, feed units or the like may be provided according to the next stage, for example, transportation, storage, accumulation (making festoon), more specifically, winding the strip around a drum to form a tire component, applying or winding on another tire component and the like.

As explained above, in the apparatus according to the present invention, a plurality of strips are manufactured at the same time in spite of the simple mechanism. Therefore, the production efficiency and production cost may be improved, and not only downsizing of the apparatus itself but also downsizing of the production system for rubber article such as pneumatic tire including the apparatus may be possible.

The invention claimed is:

1. An apparatus for making fiber-containing rubber strips each including short fibers oriented in the widthwise direction of the strip, the apparatus comprising
    a screw section for pushing out a fluid mixture of unvulcanized rubber and short fibers as fiber-containing rubber,
    an orienting section comprising
        a radially extending path for the fiber-containing rubber defined between confronting stationary surfaces and provided with an inlet in the center thereof so that the fiber-containing rubber is expanded circumferentially while flowing radially from the center towards the periphery, and
        a second path extending between said inlet and a downstream end of the screw section,
    a looped nozzle on the periphery of the radially extending path, and
    a dividing section comprising a plurality of cutter means arranged around the looped nozzle and extending across a gap of the nozzle so that the fiber-containing rubber extruded from the looped nozzle is circumferentially divided into a plurality of strips.

2. An apparatus according to claim 1, wherein a diameter D1 of the inlet is not more than ⅓ times a diameter D2 of the looped nozzle.

3. An apparatus according to claim 1, wherein
    the confronting stationary surfaces are formed on two opposite circular walls, and
    the gap between the two opposite circular walls is 0.5 to 10.0 mm.

4. An apparatus according to claim 1, wherein
    the confronting stationary surfaces are formed on two opposite circular walls, and
    said inlet opens to the inside of the path as a circular hole at the center of one of the two opposite circular walls, and the other wall is provided at the center thereof with a circular conical surface protruding towards the inlet.

5. An apparatus according to claim 4, wherein
the gap between the two opposite circular walls is 0.5 to 10.0 mm,
the amount of protrusion of the circular conical surface is in a range of from 0.5 to 1.2 times the gap, and the cone angle of the circular conical surface is in a range of 90 to 150 degrees.

6. An apparatus according to claim 1, wherein the second path is perpendicularly connected to the inlet of the radially extending path and tapers towards the inlet se in order that the short fibers in the fiber-containing rubber flowing through the axial path are oriented in the flowing direction before said inlet.

7. An apparatus according to claim 6, wherein the second path comprises the tapered part tapering towards the inlet and a substantially constant diameter part connecting the tapered part with the inlet of the radially extending path.

8. An apparatus for making strips of fiber-containing rubber comprising
a screw section for pushing out a fluid mixture of unvulcanized rubber and short fibers as fiber-containing rubber,
an orienting section comprising a radially extending path for the fiber-containing rubber provided with an inlet in the center thereof and an axial path which is perpendicularly connected to the inlet of the radially extending path and tapers towards the inlet, so that the fiber-containing rubber is expanded circumferentially while flowing radially from the center towards the periphery,
a looped nozzle on the periphery of the radially extending path, and
a dividing section comprising a plurality of cutter means arranged around the looped nozzle so that the fiber-containing rubber extruded from the looped nozzle is circumferentially divided into a plurality of strips.

9. An apparatus according to claim 8, wherein the axial path comprises the tapered part tapering towards the inlet and a substantially constant diameter part connecting the tapered part with the inlet of the radially extending path.

10. An apparatus according to claim 8, wherein a diameter D1 of the inlet is not more than 1/3 times a diameter D2 of the looped nozzle.

11. An apparatus according to claim 8, wherein the radially extending path is defined between two opposite circular walls, and the gap between the two opposite circular walls is 0.5 to 10.0 mm.

12. An apparatus according to claim 8, wherein the radially extending path is defined between two opposite circular walls, and said inlet opens to the inside of the path as a circular hole at the center of one of the two opposite circular walls, and the other wall is provided at the center thereof with a circular conical surface protruding towards the inlet.

13. An apparatus according to claim 12, wherein the gap between the two opposite circular walls is 0.5 to 10.0 mm, the amount of protrusion of the circular conical surface is in a range of from 0.5 to 1.2 times the gap, and the angle of the conical surface is in a range of 90 to 150 degrees.

* * * * *